US005622386A

United States Patent [19]
Young

[11] Patent Number: 5,622,386
[45] Date of Patent: Apr. 22, 1997

[54] BINDER APPARATUS WITH REMOVABLE OUTER COVER

[75] Inventor: Roy Young, Vernon, Ind.

[73] Assignee: Rock-Tenn Company, Norcross, Ga.

[21] Appl. No.: 403,465

[22] Filed: Mar. 14, 1995

[51] Int. Cl.$^{6}$ .............................. B42F 13/00; B23P 11/00
[52] U.S. Cl. ................................ 281/36; 281/29; 402/73; 29/402.08; 29/426.1; 29/525.06
[58] Field of Search ................................ 281/4, 17, 19.1, 281/29, 34, 35, 36, 50; 402/70, 73, 75, 76, 77; 29/525.2, 507, 510, 402.08, 402.09, 402.04, 525.06, 426.1

[56] References Cited

U.S. PATENT DOCUMENTS

| | | | |
|---|---|---|---|
| 529,614 | 11/1894 | Frith . | |
| 908,596 | 1/1909 | Morden . | |
| 1,840,928 | 1/1932 | Anthony | 29/525.2 |
| 1,895,972 | 1/1933 | Childs . | |
| 2,543,866 | 3/1951 | Panfil | 281/19.1 |
| 3,175,847 | 3/1965 | McKowen | 281/36 |
| 3,252,461 | 5/1966 | Schade . | |
| 3,262,454 | 7/1966 | Shillinger | 281/19.1 |
| 3,572,957 | 3/1971 | Strassberg . | |
| 3,809,485 | 5/1974 | Beyer . | |
| 3,847,718 | 11/1974 | Watson . | |
| 4,019,823 | 4/1977 | Kleinert et al. . | |
| 4,120,517 | 10/1978 | Staats | 281/19.1 |
| 4,571,109 | 2/1986 | Lapertosa . | |
| 4,583,877 | 4/1986 | Wilson . | |
| 4,629,349 | 12/1986 | Pitts . | |
| 4,722,628 | 2/1988 | Rager | 402/75 |
| 4,744,592 | 5/1988 | Barnette et al. . | |
| 5,100,253 | 3/1992 | Cooper | 402/75 |
| 5,445,468 | 8/1995 | Pacione | 402/75 |

FOREIGN PATENT DOCUMENTS

| | | |
|---|---|---|
| 1104022 | 2/1965 | United Kingdom . |

*Primary Examiner*—S. Thomas Hughes
*Attorney, Agent, or Firm*—Jones & Askew

[57] ABSTRACT

A binder apparatus including a replaceable outer cover. The outer cover is formed of a completely recyclable material such as paperboard to allow it to be recycled after it has been removed from the ring binder mechanism. The spine of the outer cover is releasably connected to a ring binder mechanism having hinged rings for holding papers and the like by a removable rivet assembly inserted through corresponding apertures in the spine and the ring binder mechanism. The removable rivet assembly includes a sleeve having a plurality of arms, and a pin having a shaft and a head. The shaft of the pin is inserted into the sleeve and holds the arms on the sleeve outward against the ring binder mechanism, thus securing the spine of the outer cover to the ring binder mechanism. The rivet assembly is inserted into the corresponding apertures in the spine and ring binder mechanism such that, when the rivet assembly is in place, the head of the pin contacts the spine of the outer cover.

4 Claims, 3 Drawing Sheets

BINDER APPARATUS WITH REMOVABLE OUTER COVER

TECHNICAL FIELD

The present invention relates generally to a binder for storing papers and the like having a removable and recyclable outer cover.

BACKGROUND OF THE INVENTION

Binders for storing papers and other articles are well known in the art. Typical binders include a ring binder mechanism that includes a base to which is connected a plurality of rings. Each ring is typically comprised of two semi-circular prongs that are mated at one point to form a generally circular ring. The non-mating end of each prong is connected to the base of the ring binder mechanism. At this connection point, each prong of each ring is hinged to rotate in opposite directions. Thus, the mating ends of each ring can be separated at the mating point to allow the insertion of papers or other articles onto the tings for storage within the binder.

The base of the ring binder mechanism is typically permanently attached to an outer cover. The outer cover provides protection for the papers and other articles stored on the rings within the binder. The outer cover may also accept printing or writing thereon to allow identification of the owner or the contents of the binder. Furthermore, the outer cover may include a clear sleeve or pocket under which an identification sheet or card may be secured to identify the binder.

Outer covers are constructed from a variety of materials and in a variety of ways. Common materials used in the construction of outer covers are synthetic, plastic-type materials, and paperboard, formed of multiple layers of a thin paper material. Outer covers are typically formed of solid plastic, or a thin plastic, canvas, or other covering surrounding a core of paperboard or other similar material. The materials and construction of outer covers subjects them to wear and damage. For example, the seams and hinge grooves of outer covers are weak points that can become worn and split. Also, a paperboard core may bend, break or become delaminated, especially around the edges.

Because the outer cover protects the papers stored on the ring binder mechanism, the outer cover can easily become scratched, stained, or otherwise marred or damaged. Binders are used in a multitude of locations, and are found in virtually every factory, office, school, and home. Binders are thus subjected to many different kinds of abuse and perils, such as being roughly thrown into school lockers by students, having coffee spilled on them by office workers, and being subjected to grease and grime by workers on factory floors or industrial plants. All of these activities subject binders to damage in which the outer cover can become undesirably marked or marred. Furthermore, when the contents of a binder are changed, any identification markings on the outer cover may be rendered inaccurate. However, because the outer cover is typically permanently attached to the base of the ring binder mechanism, the outer cover cannot be replaced with another cover. Therefore, a damaged, marred, or otherwise undesirably marked outer cover cannot be changed. The only way to obtain a new outer cover is to discard the entire old binder and obtain an entirely new binder.

Generally, the useful life of the ring binder mechanism is much greater than that of the outer cover because the outer cover becomes damaged or undesirably marked long before the ring binder mechanism fails. Because the ring binder mechanism cannot be easily removed from the old outer cover and attached to a new outer cover, the entire binder including the operational ring binder mechanism must be discarded and the contents of the binder transferred to a new binder when a new outer cover is desired. Not only is discarding the entire binder, including the ring binder mechanism, an inefficient waste of money, it is also environmentally undesirable as landfill space is viewed as becoming increasingly scarce and therefore should not be filled with articles whose useful life has not been completely exhausted.

Furthermore, the explosion in the use of plastics has created certain environmental concerns. One of the benefits of plastic, i.e., its strength and durability, is ironically one of its perceived drawbacks. In the present era of environmental awareness, the effect of discarded products is being increasingly scrutinized. Because plastics are typically non-biodegradable or slow to degrade and fill a substantial percentage of landfill space, products that use plastics are increasingly being viewed as undesirable.

Thus, consumers' desire for products constructed of biodegradable materials is on the rise. Also, recyclable products and products whose useful lives can be extended by using replacement parts are gaining an increasing measure of acceptance in the marketplace.

SUMMARY OF THE INVENTION

The present invention provides a binder apparatus that includes a replaceable outer cover. The spine of the outer cover is releasably connected to a ring binder mechanism having hinged rings for holding papers and the like by a removable rivet assembly inserted through corresponding apertures in the spine and the ring binder mechanism.

The removable rivet assembly includes a sleeve having a plurality of arms, and a pin having a shaft and a head. The shaft of the pin is inserted into the sleeve and holds the arms on the sleeve outward against the ring binder mechanism, thus securing the spine of the outer cover to the ring binder mechanism. The rivet assembly is inserted into the corresponding apertures in the spine and ring binder mechanism such that, when the rivet assembly is in place, the head of the pin contacts the spine of the outer cover.

The outer cover may be formed, either in whole or in part, of a recyclable material such as paperboard to allow it to be recycled after it has been removed from the ring binder mechanism.

The present invention also provides a method of replacing the outer cover that includes disengaging the removable rivet assembly by pushing the pin out of the sleeve, removing the rivet assembly from the ring binder mechanism and the spine of the outer cover, and then connecting another outer cover to the ring binder mechanism with the rivet assembly. The present invention also provides a further method of recycling the outer cover by removing a recyclable first outer cover and connecting a second outer cover to the ring binder mechanism, and then delivering the first outer cover to be recycled.

Thus, it is an object of the present invention to provide a binder apparatus that includes a replaceable cover.

It is another object of the present invention to provide a binder apparatus that includes a replaceable cover releasably secured to a ring binder mechanism by a removable rivet assembly.

It is a further object of the present invention to provide a binder apparatus that includes a replaceable outer cover made from a recyclable material.

It is a still further object of the present invention to provide a binder apparatus that includes a replaceable cover made from paperboard.

Other objects, features, and advantages of the present invention will become apparent upon reading the following specification, when taken in conjunction with the drawings and the appended claims.

DETAILED DESCRIPTION OF THE DISCLOSED EMBODIMENT

Figure 2:
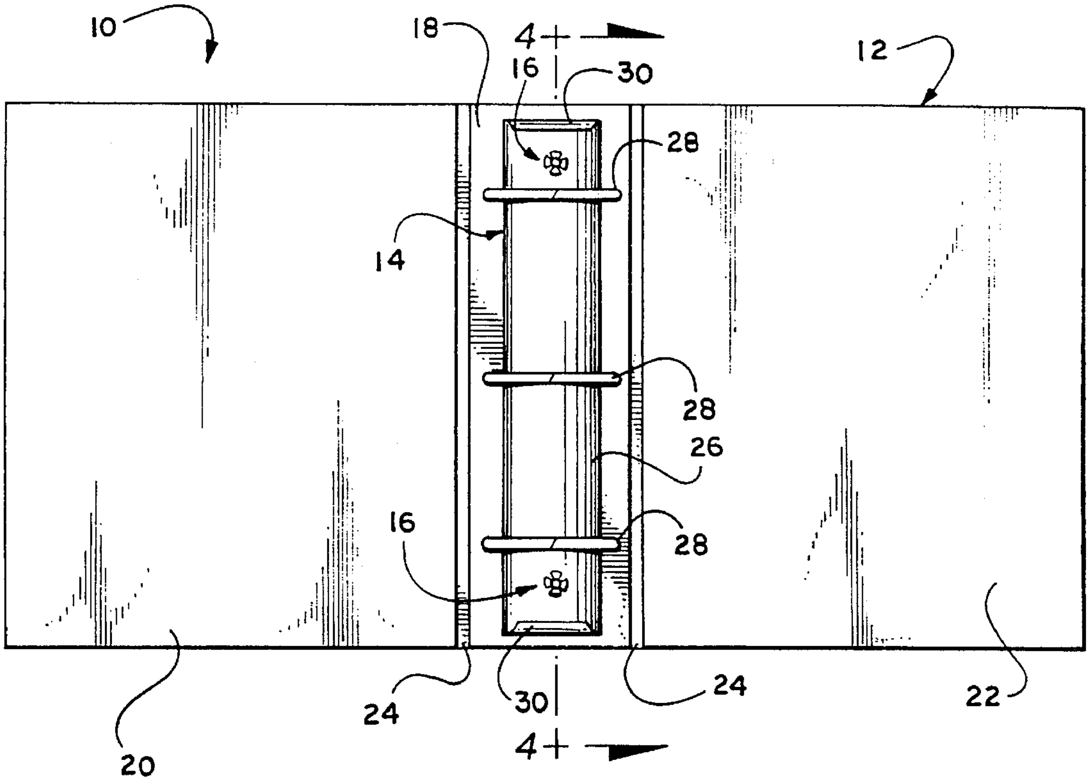
FIG. 2 is a plan view of a binder apparatus in a fully opened position.

Turning next to the drawing figures in which like numerals represent like parts, the preferred embodiment will now be described in detail.

Figure 1:
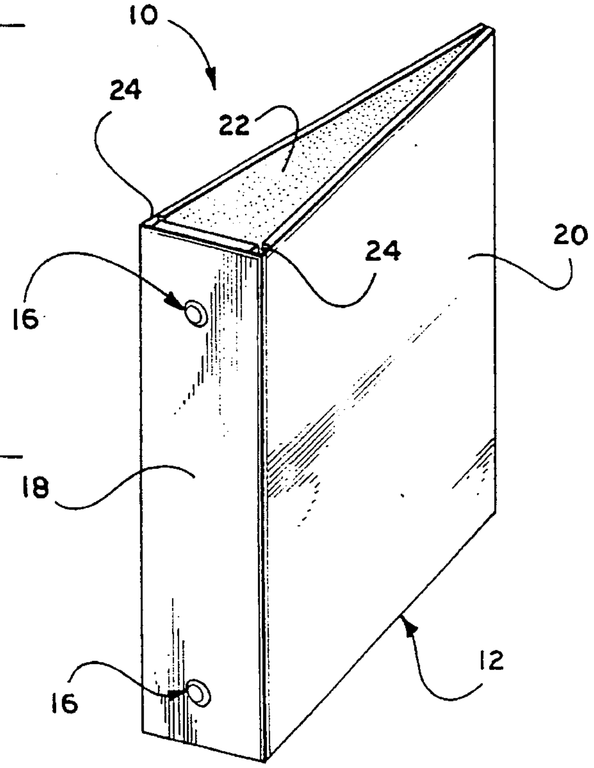
FIG. 1 is an isometric view of a binder apparatus.

FIG. 1 shows a binder apparatus, generally shown at 10, constructed in accordance with the present invention. The binder apparatus of FIG. 1 is shown in a closed position in a vertical orientation, much as the binder would appear when placed on a bookshelf or other flat surface.

Figure 5:
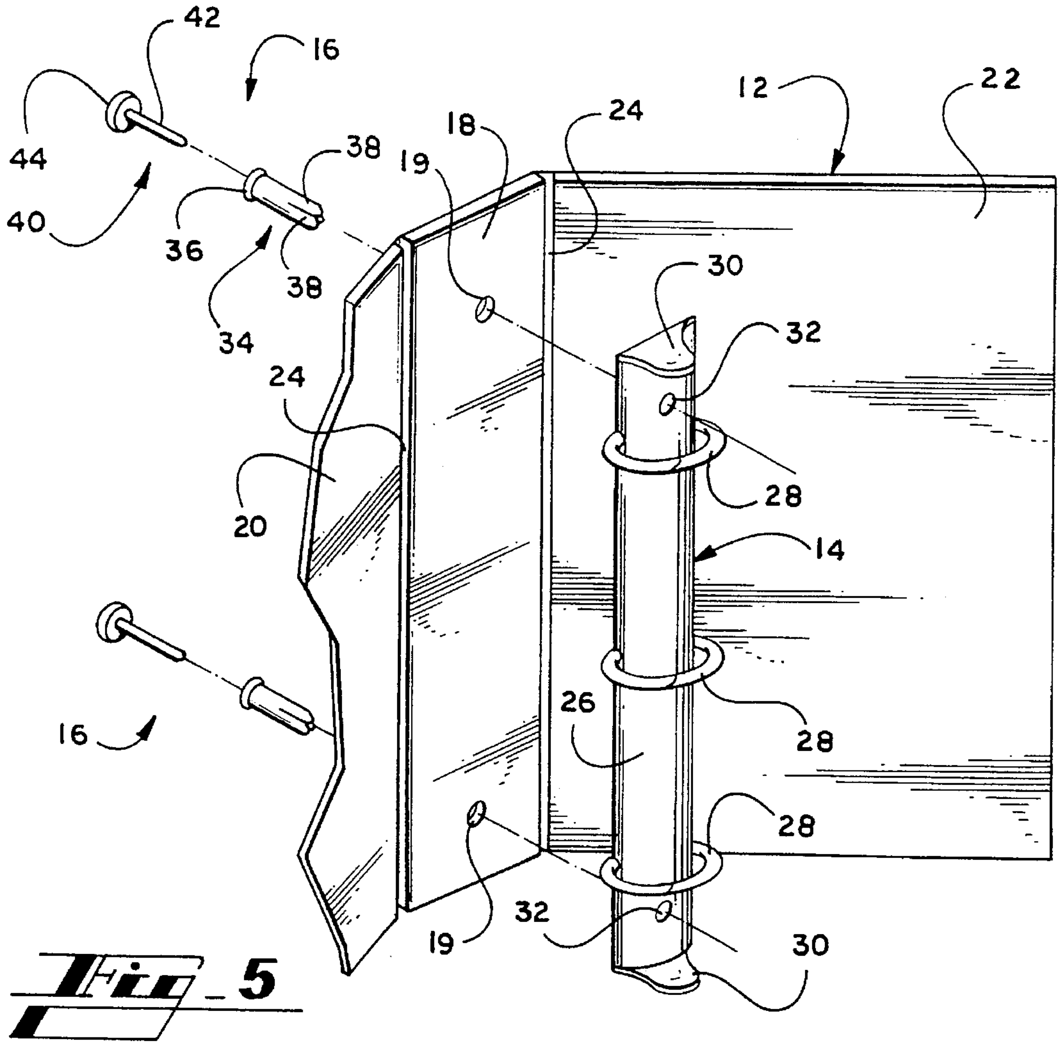
FIG. 5 is an exploded view showing the individual components of the binder apparatus of the present invention.

The binder apparatus 10 of the present invention comprises three major assemblies, as best seen in FIG. 5. The binder apparatus includes an outer cover 12, a ring binder mechanism 14, and rivet assemblies 16. The outer cover 12 of the binder apparatus 10 is removably connected to the ring binder mechanism 14 by rivet assemblies 16 extending through corresponding apertures in the outer cover and the ring binder mechanism. Disengaging and removing the rivet assemblies 16 allows the outer cover 12 to be disconnected from the ring binder mechanism 14 such that a replacement outer cover can be connected in its place.

The outer cover 12 of the binder apparatus 10 will now be described with reference to FIGS. 1–5. The outer cover includes a spine 18, a front panel 20, and a back panel 22. Preferably, the outer cover 12 of the binder apparatus 10 is constructed of a completely recyclable material such that no disassembly of the detached outer cover is required prior to recycling. Preferably, the outer cover is formed on a single type of recyclable material, such as a single integral sheet of paperboard, a laminate of a thin paper material. However, the present invention should not be construed to be limited to a single type of outer cover and it is contemplated that the outer cover may be formed of any material and in any manner that provides the requisite protective qualities for papers or other articles stored within the binder apparatus.

Figure 3:
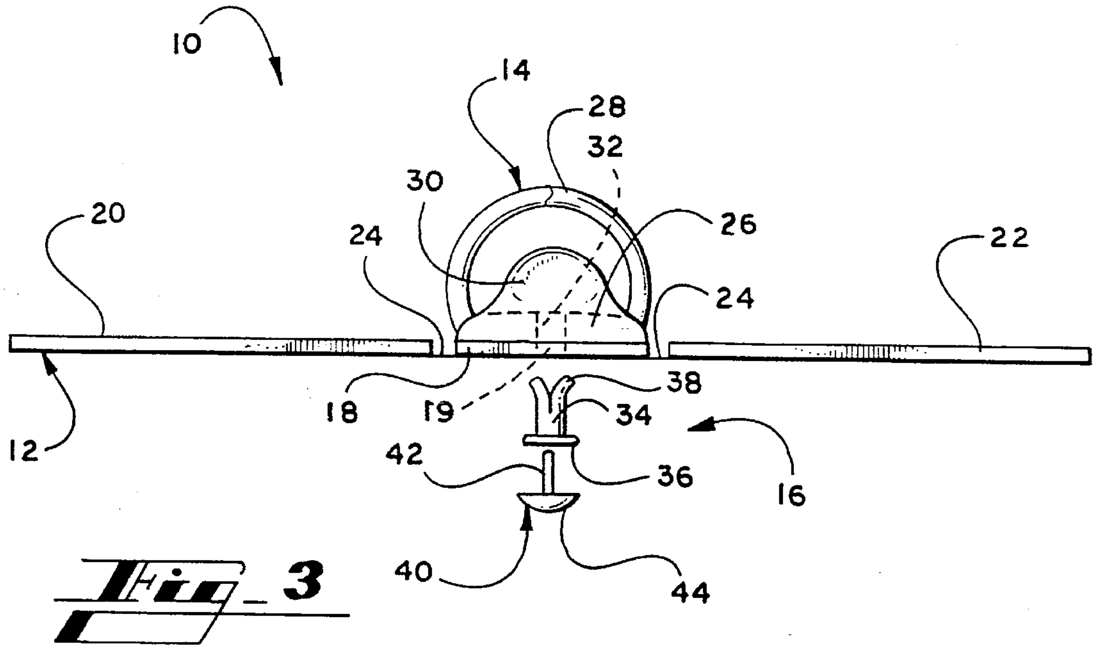
FIG. 3 is a bottom view of the binder apparatus of the present invention in a fully opened position.

The front panel 20 and back panel 22 are connected to the spine 18 at hinge grooves 24, as best seen in FIGS. 2 and 3. Preferably, the material that forms the outer cover is of a generally uniform thickness throughout the entire outer cover. However, each hinge groove is defined by a line or strip of outer cover material that is thinner than the otherwise uniform thickness. The thin hinge groove allows the outer cover to be bent or folded along the length of the groove, thus allowing the front panel 20 and back panel 22 to be rotated between a closed position, as seen in FIG. 1, and an opened position, as seen in FIG. 2. It should also be understood that the hinge grooves, by the nature of their formation as thin portions of the outer cover, are not as strong the thicker portions of the outer cover and thus are more prone to splitting or breaking.

The paperboard outer cover of the preferred embodiment of the present invention includes hinge grooves 24, as best shown in FIG. 3. The paperboard outer cover is preferably a laminate formed of multiple layers of a paper-type material. The hinge grooves 24 of the present invention are preferably defined by the absence of all but a thin layer of paper material along the length and width of the hinge groove. The hinge grooves may be defined or formed by any appropriate method of construction. The hinge grooves may be defined during the paperboard making process by creating the spine, front panel, and back panel separately on a thin layer of paperboard while leaving gaps therebetween that define the hinge grooves. This method creams hinge grooves without the need for subsequently cutting or routing.

Alternatively, if the entire outer cover is formed as a single, uniformly thick laminate, the hinge grooves can subsequently be defined by cutting, routing, or otherwise removing a portion of the paperboard laminate. It should be understood that other materials, such as plastic, may be used to form the outer cover and other suitable methods associated with the composition of these materials may be used to create the hinge grooves.

The ring binder mechanism 14 of the binder apparatus is best shown in FIG. 5. The ring binder mechanism is generally the standard ring binder mechanism in common use. The ring binder mechanism includes a base 26 to which the ends of three hinged rings 28 are connected. Each ring is comprised of two generally semi-circular prongs that mate at one point. The tings can be opened, or separated at the mating point, by pressing levers 30 outward. Papers or other articles can then be placed over the rings and the rings closed to secure the articles within the binder.

Figure 4:
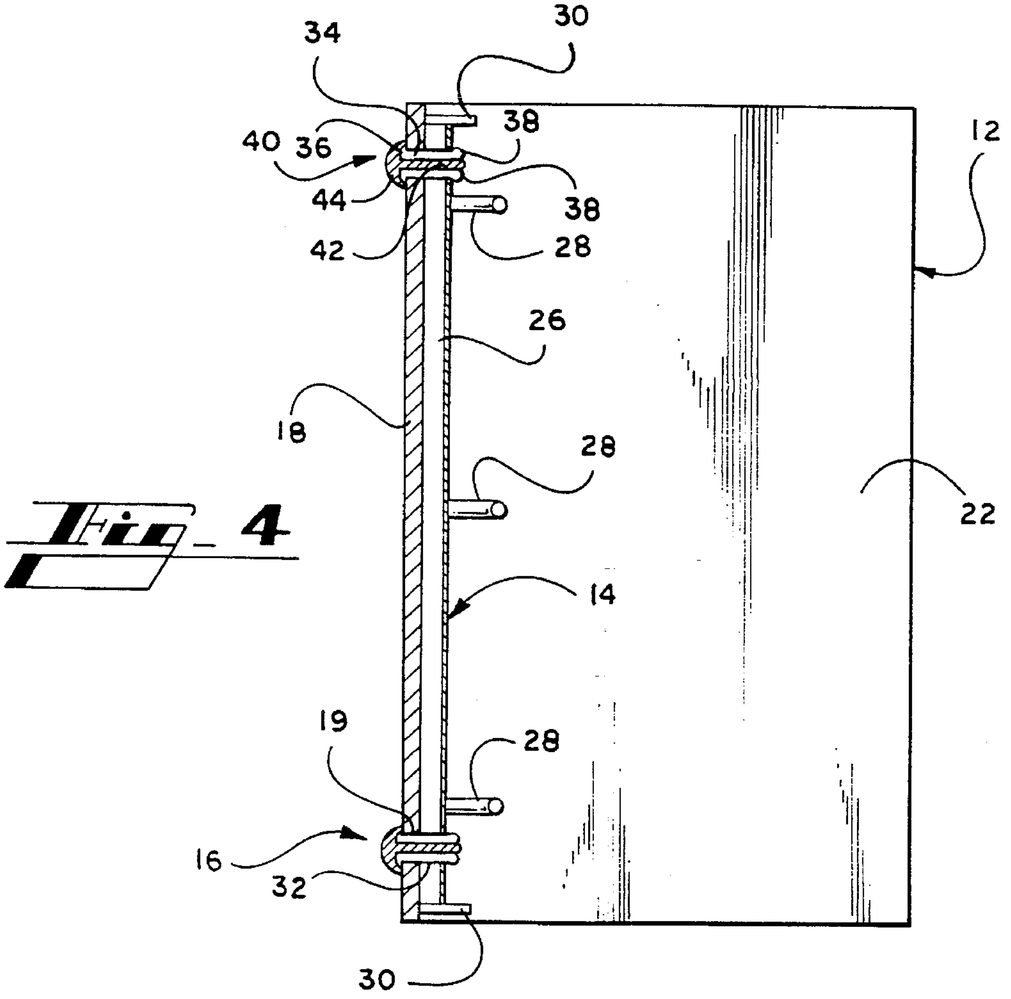
FIG. 4 is a cross-sectional view of the binder apparatus of the present invention taken along line 4—4 in FIG. 2.

The ring binder mechanism 14 is removably connected to the spine 18 by rivet assemblies 16. The base 26 of ring binder mechanism 14 includes apertures 32. The spine 18 of the outer cover also includes apertures 19 corresponding in size and location to the apertures in the base 26 of the ring binder mechanism. As best seen in FIG. 4, a rivet assembly 16 is placed through the corresponding apertures and removably connects the spine of the outer cover to the ring binder mechanism.

The rivet assembly 16 comprises a pin 40 and a sleeve 34, as seen in FIG. 3. The sleeve 34 is a generally cylindrical body having a generally circular opening longitudinally therethrough. The circular opening is of a diameter such that the shaft 42 of the pin 40 can be inserted into the sleeve 34.

The sleeve 34 includes a lip 36 formed on one end and a plurality of arms 38 flared slightly outward on the opposite end of the sleeve. The sleeve is preferably integrally formed of plastic or other slightly flexible and resilient material such that the arms can be slightly displaced inwardly toward the center of the sleeve.

It is seen in FIG. 3 that the ends of the flared arms 38 extend slightly wider than the diameter of the apertures in the spine and the base of the ring binder apparatus. It is also seen in FIG. 4 that the length of the sleeve is slightly greater than the combined thickness of the spine of the outer cover and the base of the ring binder apparatus.

The rivet assembly is removable, i.e., it can be engaged and disengaged virtually an unlimited number of times. To engage the rivet assembly to connect the spine to the ring binder mechanism, the sleeve 34 is placed first through the aperture in the spine 19 and then through the corresponding aperture 32 in the base of the ring binder mechanism. To place the sleeve through each aperture, the flared arms 38 of the sleeve must be displaced slightly inward such that the greatest distance between the arms is less than the diameter of the apertures. This can be easily done, for example, by pinching or pressing the arms inward with one's fingers. The sleeve is inserted through the apertures in the spine and base until the lip 36 contacts the spine 18 of the outer cover. The lip 36 ensures that the sleeve is properly positioned in the apertures. It should be noted that when the sleeve 34 is inserted through the apertures such that the lip contacts the spine of the outer cover, the ends of the arms 38 extend slightly beyond the aperture in the base of the ring binder mechanism, as seen in FIG. 4. The arms also extend outwardly a small distance beyond the circumference of the aperture in the base. This allows the ends of the arms to "grip" the base. The base is thus connected to the spine because the arms and lip force contact and prevent separation of the base and spine.

Figure 6A:
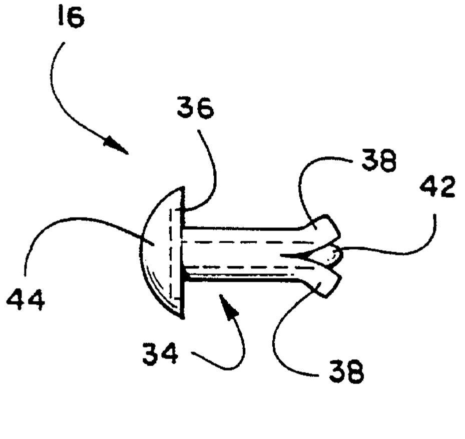
FIG. 6A is a side view of the removable rivet assembly in the engaged position.
Figure 6B:
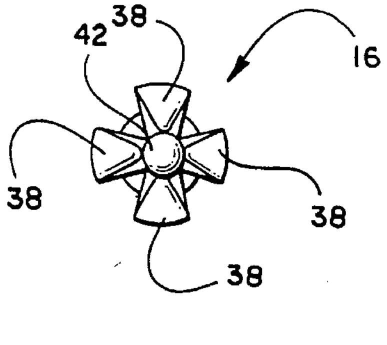
FIG. 6B is a bottom view of the removable rivet assembly in the engaged position.

The shaft 42 of pin 40 is placed within each sleeve 34, through the opening at the lip end of the sleeve. The pin is inserted into the sleeve until the head 44 of the pin 40 contacts the spine 18, or alternatively, contacts the lip 36 of the sleeve. As seen in FIG. 4, the shaft of the pin extends approximately an equal distance as the ends of the arms 38 of the sleeve. When fully inserted into the sleeve, the shaft 42 physically prevents the arms 38 from being displaced inwardly, as seen in FIGS. 6A and 6B, thus ensuring that the ends of the arms continue to "grip" the base. The shaft fits somewhat snugly within the sleeve such that the pin is firmly, but removably, held in place.

When it is desired that the outer cover be removed from the ring binder mechanism, the rivet assembly is disengaged. Disengaging the rivet assembly requires first that the pin be removed from the sleeve, the arms be displaced inward, toward the center of the sleeve, and the sleeve then be removed from the apertures in the base of the ring binder mechanism and the spine. The pin is removed from the sleeve by pressing the end of the shaft toward the head of the pin. When engaged, the shaft is firmly, but removably held within the sleeve, so that pushing the shaft out of the sleeve is not difficult. This can be accomplished by pushing the end of the shaft toward the head with the tip of a pencil or other similar narrow object. Once the shaft is removed from the sleeve, the arms can then be displaced toward the center of the sleeve because the shaft is no longer present to prevent such displacement. When the arms have been displaced a sufficient distance, the sleeve may be pushed backwards through the apertures in the base and the spine until the sleeve is completely removed. When all sleeves are removed, the base of the ring binder mechanism is disconnected from the spine of the outer cover and another outer cover may be connected to the base with the same rivet assemblies.

In the preferred embodiment of the present invention, the outer cover is constructed of a completely recyclable material. After removal of the recyclable cover, the outer cover can be delivered to an appropriate facility for recycling thereof. Also, in the preferred embodiment, the outer cover is constructed of a single type of completely recyclable material such as recyclable paperboard and thus requires no disassembly prior to recycling. The outer cover may be a single piece of recyclable material.

From the foregoing it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and ways of constructing other embodiments of the present invention will suggest themselves to practitioners of the art. Therefore, the scope of the present invention is to be limited only by the claims below.

I claim:

1. A binder apparatus having a replaceable outer cover, comprising:

a recyclable outer cover including a spine, a front panel, and a back panel;

a ring binder mechanism; and a removable rivet assembly inserted through corresponding apertures in said spine and said ring binder mechanism;

wherein said removable rivet assembly includes a sleeve and a pin for insertion into said sleeve, and wherein said pin holds arms on said sleeve against said ring binder mechanism thereby connecting said ring binder mechanism to said spine.

2. The apparatus of claim 1 wherein said pin comprises a shaft and a head, wherein said shaft is inserted through the corresponding apertures in said spine and said ring binder mechanism such that said head contacts said spine.

3. A method of replacing an outer cover of a binder apparatus, said outer cover having a spine, a front panel, and a back panel, said spine being connected to a ring binder mechanism, said method comprising the steps of:

disengaging a removable rivet assembly that includes a sleeve and a pin for insertion into the sleeve, and wherein the pin holds arms on the sleeve against the ring binder mechanism thereby releasably connecting the ring binder mechanism to the spine of the outer cover;

removing the rivet assembly from the ring binder mechanism and the spine of the outer cover, thereby disconnecting the spine of the outer cover from the ring binder mechanism; and releasably connecting another outer cover to the ring binder mechanism with the removable rivet assembly by inserting the rivet assembly through predefined corresponding apertures in the spine of the outer cover and the ring binder mechanism.

4. The method of claim 3 wherein said outer cover is formed of paperboard.

* * * * *